United States Patent
Lee et al.

(10) Patent No.: US 8,159,143 B2
(45) Date of Patent: Apr. 17, 2012

(54) LIGHT GENERATING MODULE, LIQUID CRYSTAL DISPLAY DEVICE HAVING THE SAME, AND METHOD OF IMPROVING COLOR REPRODUCIBILITY THEREOF

(75) Inventors: Sang-Gil Lee, Seoul (KR); Hyeon-Yonh Jang, Osan-si (KR)

(73) Assignee: Samsung Electronics Co., Ltd. (KR)

( * ) Notice: Subject to any disclaimer, the term of this patent is extended or adjusted under 35 U.S.C. 154(b) by 1200 days.

(21) Appl. No.: 11/625,361

(22) Filed: Jan. 22, 2007

(65) Prior Publication Data

US 2007/0170443 A1   Jul. 26, 2007

(30) Foreign Application Priority Data

Jan. 23, 2006   (KR) .................. 10-2006-0006714

(51) Int. Cl.
*G05F 1/00*   (2006.01)
(52) U.S. Cl. ........ 315/291; 315/312; 345/102; 345/205; 345/82; 349/61; 349/104; 349/108
(58) Field of Classification Search .................. 315/291, 315/312, 316, 318, 224; 345/102, 205–207, 345/82, 83; 349/61–65, 104, 106, 108; 362/612, 362/613, 615, 230, 231
See application file for complete search history.

(56) References Cited

U.S. PATENT DOCUMENTS

| | | | | |
|---|---|---|---|---|
| 7,277,079 | B2 * | 10/2007 | Kobayashi et al. | 345/102 |
| 7,443,469 | B2 * | 10/2008 | Maeda et al. | 349/108 |
| 7,449,351 | B2 * | 11/2008 | Yamada | 438/29 |
| 7,482,636 | B2 * | 1/2009 | Murayama et al. | 257/98 |
| 7,622,863 | B2 * | 11/2009 | Seo et al. | 313/506 |
| 7,635,955 | B2 * | 12/2009 | Yoo et al. | 315/219 |
| 7,638,754 | B2 * | 12/2009 | Morimoto et al. | 250/226 |
| 7,731,389 | B2 * | 6/2010 | Draganov et al. | 362/231 |

* cited by examiner

*Primary Examiner* — Haissa Philogene
(74) *Attorney, Agent, or Firm* — Cantor Colburn LLP

(57) ABSTRACT

A light generating module includes a light emitting part and a power supplying part. The light emitting part includes a first region and a second region. First and second lights having different wavelengths from each other are generated in each of the first and second regions. The first region is an outermost region of the light emitting part. The power supplying part applies different currents to the first region from the second region to generate the first and second lights having different intensities from each other. Therefore, color uniformity is increased so that an image display quality is improved.

23 Claims, 9 Drawing Sheets

LIGHT GENERATING MODULE, LIQUID CRYSTAL DISPLAY DEVICE HAVING THE SAME, AND METHOD OF IMPROVING COLOR REPRODUCIBILITY THEREOF

The present application claims priority to Korean Patent Application No. 2006-6714, filed on Jan. 23, 2006 and all the benefits accruing therefrom under 35 U.S.C. §119, and the contents of which in its entirety are herein incorporated by reference.

BACKGROUND OF THE INVENTION

1. Field of the Invention

The present invention relates to a light generating module, a liquid crystal display ("LCD") device having the light generating module, and a method of improving color reproducibility thereof. More particularly, the present invention relates to a light generating module capable of improving color reproducibility, an LCD device having the light generating module, and a method of improving color reproducibility thereof.

2. Description of the Related Art

A backlight unit including light emitting diodes ("LEDs"), in general, has a better color reproducibility than a backlight unit including a cold cathode fluorescent lamp ("CCFL").

Each of the optical clusters of the backlight unit including the LEDs is defined by red, green, and blue LEDs. The clusters are attached to a metal printed circuit board ("PCB") to mix red, green, and blue lights generated from the red, green, and blue LEDs, thereby supplying an LCD panel with the mixed red, green, and blue lights.

However, the red, green, and blue lights are not mixed on an uppermost portion and a lowermost portion of the LCD panel. For example, the red, green, and blue lights on a central portion of the LCD panel are mixed with each other. However, when a red LED and a blue LED are on the uppermost portion and the lowermost portion, respectively, a reddish image and a bluish image are displayed on the uppermost portion and the lowermost portion of the LCD panel, respectively.

BRIEF SUMMARY OF THE INVENTION

The present invention provides a light generating module capable of improving color reproducibility.

The present invention also provides a liquid crystal display ("LCD") device having the above-mentioned light generating module.

The present invention also provides a method of improving color reproducibility.

A light generating module in accordance with exemplary embodiments of the present invention includes a light emitting part and a power supplying part. The light emitting part includes a first region and a second region. First and second lights having different wavelengths from each other are generated in each of the first and second regions. The first region is an outermost region of the light emitting part. The power supplying part applies different currents to the first region from the second region to generate the first and second lights having different intensities from each other.

The light emitting part may further include a plurality of optical clusters, and each of the optical clusters may include a first light emitting element generating the first light and a second light emitting element generating the second light.

The light generating module may further include an optical sensor applying a first light sensing signal and a second light sensing signal to a power supplying part, the first light sensing signal corresponding to luminance of the first light and the second light sensing signal corresponding to luminance of the second light. The light emitting part may further include a first light emitting element in the first region adjacent to a side of the light emitting part to generate the first light, and a second light emitting element in the first region spaced apart from the side of the light emitting part to generate the second light.

Each of the first region and the second region may emit third light having a different wavelength from the first and second lights. An optical sensor may apply a first light sensing signal corresponding to luminance of the first light, a second light sensing signal corresponding to luminance of the second light and a third light sensing signal corresponding to luminance of the third light to a power supplying part.

The light emitting part may further include a first light emitting element generating the first light, a second light emitting element generating the second light and a third light emitting element generating the third light. The first, second and third light emitting elements may be arranged in serial.

An LCD device in accordance with another embodiment of the present invention includes a light emitting part, a power supplying part and an LCD panel. The light emitting part includes a first region and a second region. First and second lights having different wavelengths from each other are generated in each of the first and second regions. The first region is an outermost region of the light emitting part. The power supplying part applies different currents to the first region from the second region to generate the first and second lights having different intensities from each other. The LCD panel includes a first substrate, a second substrate and a liquid crystal layer interposed between the first and second substrates to display an image using the first and second lights generated from the light emitting part.

The light emitting part may further include a plurality of optical clusters, and each of the optical clusters may include a first light emitting element generating the first light and a second light emitting element generating the second light.

The light emitting part may further include a third region emitting first and second lights having different wavelengths from each other. The third region may be opposite to the first region. The optical clusters may be arranged in each of the first, second and third regions. The optical cluster adjacent to the outermost region may include a first light emitting element adjacent to a side of the light emitting part to receive a lower current, and a second light emitting element spaced apart from the side of the light emitting part to receive a higher current that is greater than the lower current.

A method of improving color reproducibility in a display panel of a display device in accordance with another embodiment of the present invention includes providing a light emitting part having a first region, a second region, and a third region, the second region disposed between the first and third regions, the first region providing light to a first outermost section of the display panel, the third region providing light to a second outermost section of the display panel, opposite the first outermost section, the second region providing light to a middle section of the display panel between the first and second outermost sections, decreasing an intensity of a red light provided to the first outermost section from the first region, increasing an intensity of a blue light provided to the first outermost section from the first region, maintaining intensity of a red light and a blue light provided to the middle section from the second region, increasing an intensity of a red light provided to the second outermost section from the third region, and decreasing an intensity of a blue light provided to the second outermost section from the third region.

A method of improving color reproducibility in a display panel of a display device in accordance with still another embodiment of the present invention includes generating first and second lights in each of a first region and a second region of a light emitting part, the first and second lights having different wavelengths from each other, the first region providing light to an outermost section of the display panel, the second region providing light to a central section of the display panel, and adjusting intensity of at least one of the first and second lights provided to the outermost section of the display panel so that the outermost section and the middle section have substantially the same color reproducibility.

According to the present invention, the adjusted currents are applied to the uppermost portion and the lowermost portion of the light generating module to compensate luminance of the light, thereby improving color uniformity.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF THE INVENTION

Figure 1:
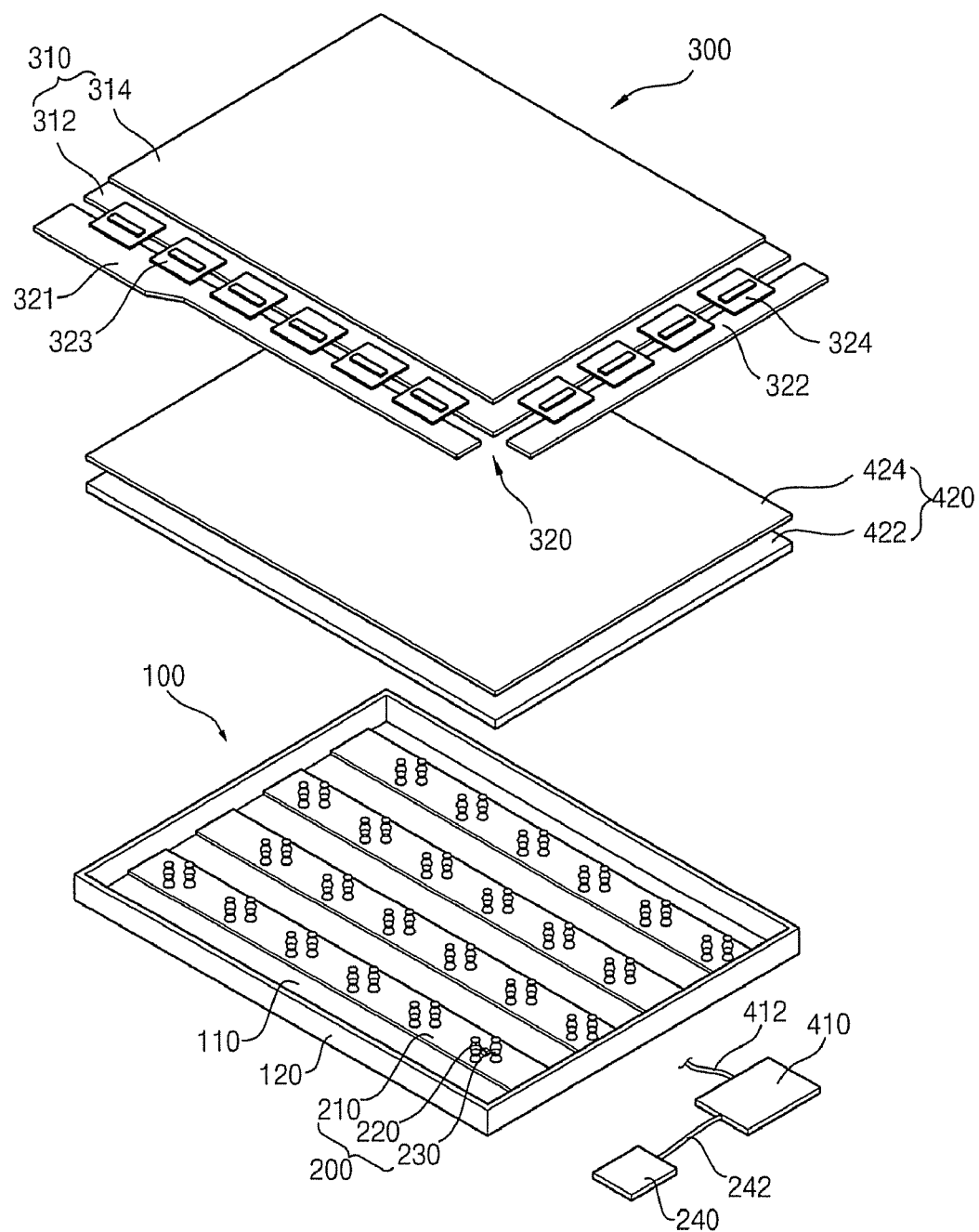
FIG. 1 is an exploded perspective view illustrating an exemplary liquid crystal display ("LCD") device in accordance with an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
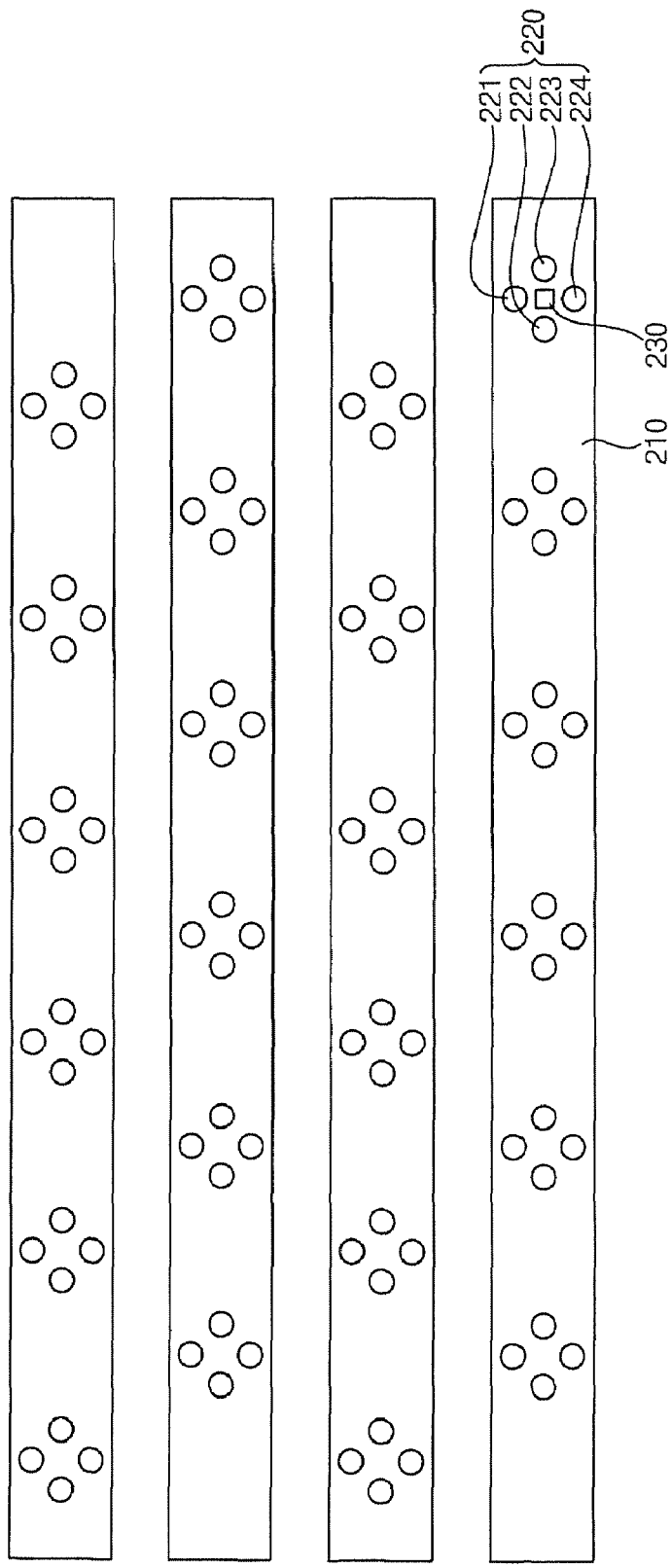
FIG. 2 is a plan view illustrating an exemplary light generating module shown in FIG. 1.

FIG. 1 is an exploded perspective view illustrating an exemplary liquid crystal display ("LCD") device in accordance with an exemplary embodiment of the present invention. FIG. 2 is a plan view illustrating an exemplary light generating module shown in FIG. 1.

Referring to FIGS. 1 and 2, the LCD device includes a receiving container 100, a light generating module 200, and a display unit 300. Alternatively, the LCD device may further include a plurality of light generating modules 200.

The receiving container 100 includes a bottom portion 110 and a side portion 120 protruded from sides of the bottom portion 110 to define a receiving space, thereby receiving the light generating module 200. For example, the receiving container 100 may include a strong metal resistant to deformation.

The light generating module 200 is on the bottom portion 110 of the receiving container 100. The light generating module 200 includes a plurality of circuit substrates 210 and a plurality of optical clusters 220 arranged on each of the circuit substrates 210.

The light generating module 200 is on the bottom portion 110 of the receiving container 100 to function as a backlight assembly. Each of the optical clusters 220 includes a plurality of light emitting elements that generates various lights. In FIGS. 1 and 2, each of the optical clusters 220 includes a red light emitting element 221, a first green light emitting element 222, a second green light emitting element 223, and a blue light emitting element 224. The red light emitting element 221 generates red light. Each of the first and second green light emitting elements 222 and 223 generates green light. The blue light emitting element 224 generates blue light. Each of the light emitting elements includes a light emitting diode ("LED", not shown) and an optical lens. The LED generates the light. The optical lens surrounds the LED to guide the light generated from the LED.

For example, the red light emitting element 221 includes a red LED and a first optical lens. The red LED generates the red light, and the first optical lens surrounds the red LED to diffuse the red light. The first green light emitting element 222 includes a first green LED and a second optical lens. The first green LED generates a first green light, and the second optical lens surrounds the first green LED to diffuse the first green light. The second green light emitting element 223 includes a second green LED and a third optical lens. The second green LED generates the second green light, and the third optical lens surrounds the second green LED to diffuse the second green light. The blue light emitting element 224 includes a blue LED and a fourth optical lens. The blue LED generates the blue light, and the fourth optical lens surrounds the blue LED to diffuse the blue light.

In FIGS. 1 and 2, each of the optical clusters 220 includes one red light emitting element 221, two green light emitting elements 222, 223, and one blue light emitting element 224. Alternatively, each of the optical clusters may include one red light emitting element, one green light emitting element, and one blue light emitting element. Also, the arrangement of the red, green, and blue light emitting elements 221, 222, 223, and 224 may vary from the illustrated optical cluster 220.

Figure 3:
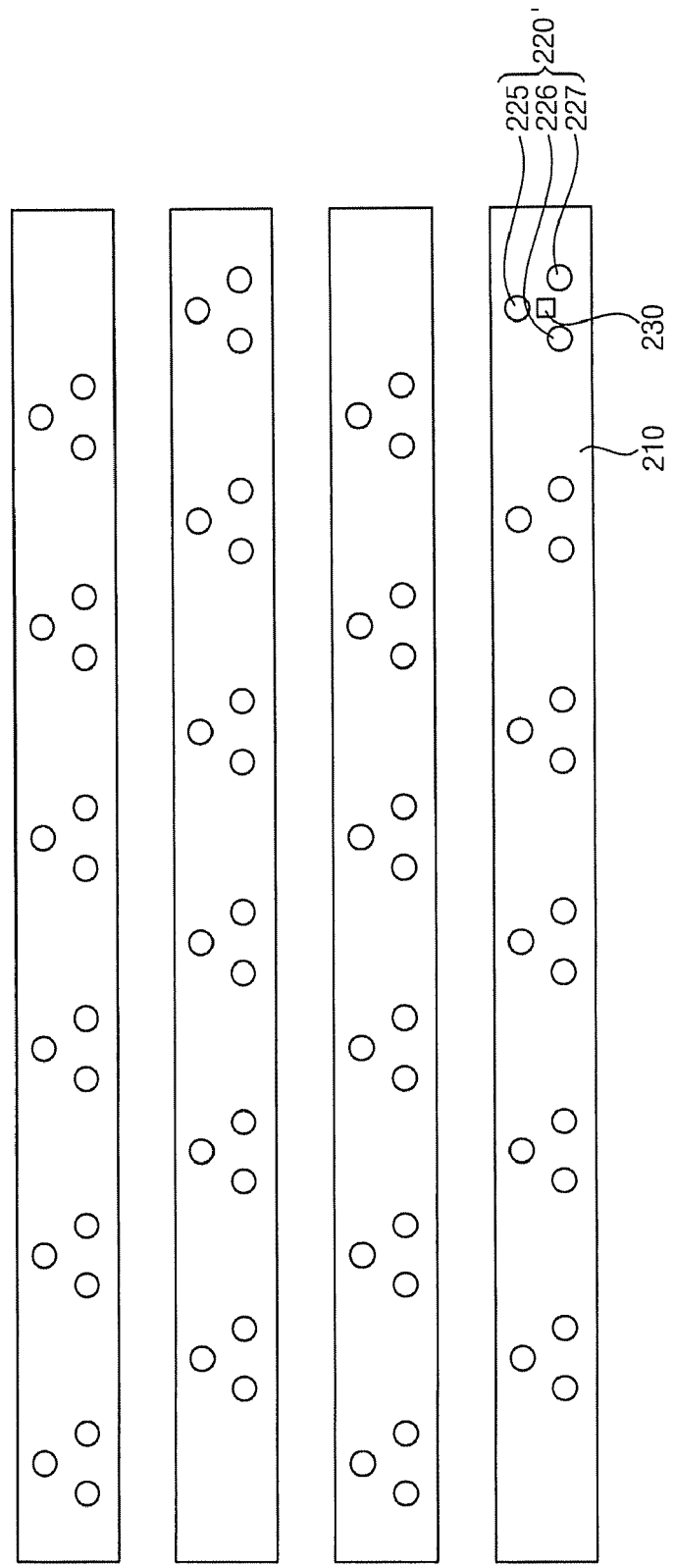
FIG. 3 is a plan view illustrating another exemplary light generating module shown in FIG. 1.

FIG. 3 is a plan view illustrating another exemplary light generating module shown in FIG. 1. The light generating module shown in FIG. 3 is substantially the same as the light generating module of FIG. 2 except an optical cluster 220. Thus, the same reference numerals will be used to refer to the same or like parts as those described in FIG. 2 and any further explanation concerning the above elements will be omitted.

Referring to FIG. 3, each of optical clusters 220' includes a red light emitting element 225, a green light emitting element 226 and a blue light emitting element 227 that are arranged in a triangular shape. Alternatively, the number of the light emitting elements in each of the optical clusters may be changed.

Referring again to FIGS. 1 and 2, the circuit substrates 210 are spaced apart from each other by a constant distance, and are arranged substantially in parallel with each other. The optical clusters 220 are alternately arranged on adjacent circuit substrates 210 of the light generating module 200 as a zigzag shape. For example, the optical clusters 220 on each of the circuit substrates 210 are between the optical clusters 220 of adjacent circuit substrates 210, such that a column of optical clusters 220 only includes optical clusters 220 from every other row. Alternate arrangements of the optical clusters 220 and the circuit substrates 210 would also be within the scope of these embodiments.

The light generating module 200 may further include a light receiving structure 230. The light receiving structure 230 includes a transparent material. Examples of the transparent material that can be used for the light receiving structure 230 include polymethylmethacrylate ("PMMA"), polycarbonate ("PC"), etc. The light receiving structure 230 is on a center of one of the optical clusters 220 to receive the light generated from the optical cluster 220. For example, the light receiving structure 230 is on an outermost optical cluster of the optical clusters 220 adjacent to sides of the display unit 300.

The light generating module 200 may further include an optical sensor 240 that senses the red, green, and blue lights. In FIG. 1, the optical sensor 240 is spaced apart from the light receiving structure 230 by a predetermined distance. Alternatively, the optical sensor 240 may be on an end portion of the light receiving structure 230 to sense the red, green, and blue lights received in the light receiving structure 230. In addition, the optical sensor 240 may change the received red, green, and blue lights into a voltage.

As illustrated, the optical clusters 220 may be arranged on each of the circuit substrates 210, and the circuit substrates 210 may be positioned on the bottom portion 110 within the receiving space of the receiving container 100. Alternatively, the circuit substrates 210 may be disposed on an outer surface of the receiving container 100, and only the optical clusters 220 that are formed on the circuit substrate 210 may be inserted into the receiving space of the receiving container 100, such as through openings formed in the bottom portion 110.

The display unit 300 includes an LCD panel 310 and a driving circuit member 320. The LCD panel 310 displays an image using the light generated from the light generating module 200. The driving circuit member 320 drives the LCD panel 310.

The LCD panel 310 includes a first substrate 312, a second substrate 314, and a liquid crystal layer (not shown). The second substrate 314 faces the first substrate 312, and is combined with the first substrate 312. The liquid crystal layer is interposed between the first and second substrates 312 and 314. The first substrate 312 includes a plurality of thin film transistors ("TFT") arranged in a matrix shape. The TFTs are switching elements. For example, the first substrate 312 includes a glass substrate or other transparent insulating substrate. A source electrode and a gate electrode of each of the TFTs are electrically connected to data and gate lines that are formed on the first substrate 312, respectively. A drain electrode of each of the TFTs is electrically connected to a pixel electrode including a transparent conductive material. The second substrate 314 includes a color filter substrate having a plurality of red, green, and blue color filters. The red, green, and blue color filters are formed on the second substrate 314 as a thin film shape. For example, the second substrate 314 includes a glass substrate or other transparent insulating substrate. A common electrode including a transparent conductive material is formed on the second substrate 314.

When a voltage is applied to the gate electrode of each of the TFTs of the LCD panel 310, the TFT is turned on so that an electric field is formed between the pixel electrode and the common electrode. Liquid crystals of the liquid crystal layer interposed between the first and second substrates 312 and 314 vary arrangement in response to the electric field applied thereto, and light transmittance of the liquid crystal layer is changed, thereby displaying the image of a predetermined gray scale.

While a particular arrangement of the LCD panel 310 is described, alternate arrangements would also be within the scope of these embodiments. For example, the color filters may be formed on the first substrate 312, or the common electrode may be formed in stripes on the first substrate 312.

The driving circuit member 320 includes a data printed circuit board ("PCB") 321, a gate PCB 322, a data driving circuit film 323, and a gate driving circuit film 324. The data PCB 321 applies a data driving signal to the LCD panel 310. The gate PCB 322 applies a gate driving signal to the LCD panel 310. The data PCB 321 is electrically connected to the LCD panel 310 through the data driving circuit film 323. The gate PCB 322 is electrically connected to the LCD panel 310 through the gate driving circuit film 324.

For example, each of the data driving circuit film 323 and the gate driving circuit film 324 includes a tape carrier package ("TCP") or a chip on film ("COF"). Alternatively, an auxiliary signal line (not shown) may be formed on the LCD panel 310 and the gate driving circuit film 324 so that the gate PCB 322 may be omitted.

The LCD device may further include a power supplying unit 410 to apply a driving voltage to the light generating module 200 so that the light generating module 200 generates the light. The driving voltage generated from the power supplying unit 410 is applied to the light generating module 200 through a first power supplying line 412.

In addition, the power supplying unit 410 applies an adjusted driving voltage to the light generating module 200 based on a light sensing signal that is generated from the optical sensor 240. The light sensing signal that is generated from the optical sensor 240 is applied to the light generating module 200 through a second power supplying line 242.

For example, when a red component of the light sensing signal is greater than each of the green and blue components of the light sensing signal, a low driving voltage, a normal driving voltage, and a high driving voltage may be applied to the red, green, and blue light emitting elements on an outermost upper portion of the light generating module 200, respectively.

In addition, the power supplying unit 410 may apply the high driving voltage, the normal driving voltage, and the low driving voltage to the blue, green, and red light emitting elements on an outermost lower portion of the light generating module 200, respectively.

However, when the red component of the light sensing signal is smaller than each of the green and blue components of the light sensing signal, the high driving voltage, the normal driving voltage, and the low driving voltage may be applied to the red, green, and blue light emitting elements on the outermost upper portion of the light generating module 200, respectively.

In addition, the power supplying unit 410 may apply the low driving voltage, the normal driving voltage, and the high driving voltage to the blue, green, and red light emitting elements on the outermost lower portion of the light generating module 200, respectively.

Thus, intensity uniformity of the red, green, and blue lights is increased so that color difference between the upper portion and the lower portion of the LCD panel 310 is decreased, thereby improving color uniformity of the LCD panel 310.

The LCD device may further include an optical member 420 on an upper portion of the light generating module 200. The optical member 420 is spaced apart from the LEDs to mix the red, green, and blue lights.

The optical member 420 may include a diffusion plate 422 and optical sheets 424. The diffusion plate 422 diffuses the light generated from the LEDs. The optical sheets 424 are on the diffusion plate 422.

The diffusion plate 422 diffuses the light generated from the LEDs to increase luminance uniformity of the light. The diffusion plate 422 may be substantially plate-shaped having a predetermined thickness. The diffusion plate 422 may include a matrix and a diffusing agent. Examples of the matrix that can be used for the diffusion plate 422 include polymethylmethacrylate ("PMMA"), polycarbonate ("PC"), etc. The diffusing agent is in the matrix to diffuse the light.

The optical sheets 424 guide the diffused light to improve optical characteristics. The optical sheets 424 may include a brightness enhancement sheet that guides the diffused light in a front direction of the LCD device to increase luminance when viewed on a plane. In addition, the optical sheets 424 may further include a diffusion sheet that diffuses the guided light having passed through the diffusion plate 422. Alternatively, the optical sheets 424 may further include various optical sheets to improve the optical characteristics.

A light guiding member (not shown) may be under the optical member 420. The light guiding member may be spaced apart from the light generating module 200. The light guiding member mixes the red, green, and blue lights generated from the light generating module 200 to generate white light. The light guiding member includes a transparent material. Examples of the transparent material that can be used for the light guiding member include PMMA, PC, etc.

According to the display device shown in FIGS. 1 and 2, the adjusted driving voltages are applied to the red, green, and blue LEDs of the outermost upper portion and the red, green, and blue LEDs of the outermost lower portion of the backlight assembly so that the red, green, and blue lights generated from the red, green, and blue LEDs are uniformly mixed, thereby improving an image display quality. The red, green, and blue LEDs may be arranged in serial.

Figure 4:
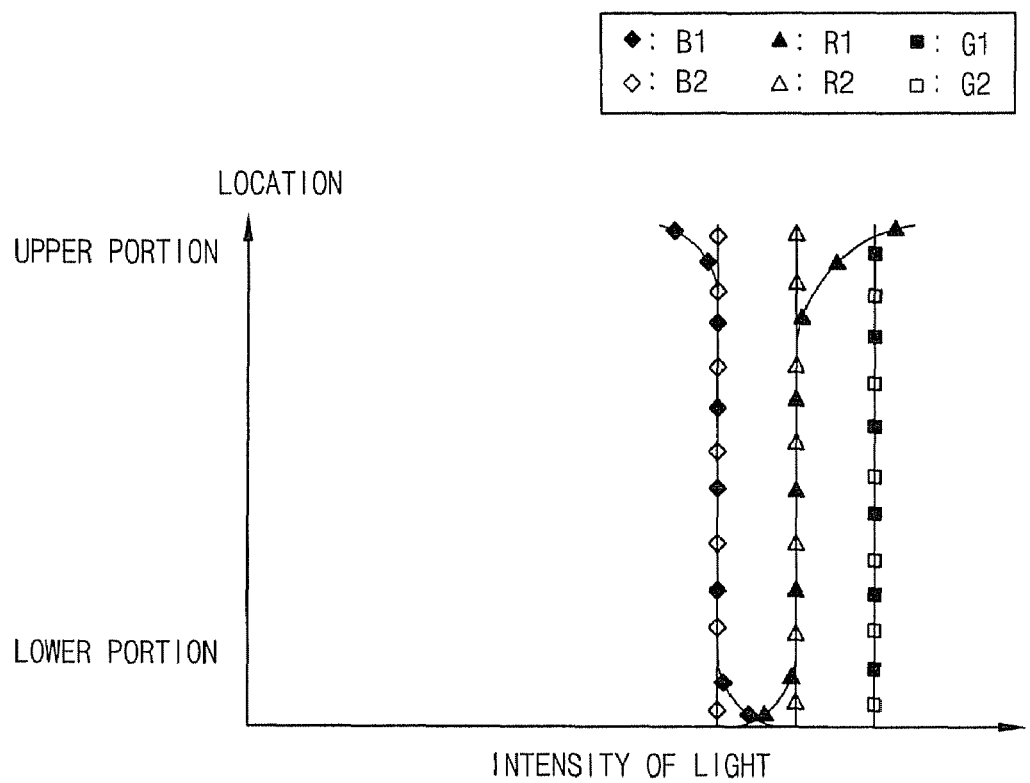
FIG. 4 is a graph showing a relationship between location and intensity of color lights on an exemplary light generating module.

Color lights generated using the adjusted driving voltages are illustrated in FIG. 4.

FIG. 4 is a graph showing a relationship between location and intensity of color lights on an exemplary light generating module. In FIG. 4, a graph R1, a graph G1, and a graph B1 represent intensities of red, green, and blue lights generated from a light generating module using normal driving voltages, respectively. In addition, a graph R2, a graph G2, and a graph B2 represent intensities of red, green, and blue lights generated from a light generating module using adjusted driving voltages, respectively.

Referring to FIG. 4, when the normal driving voltages are applied to the light generating module, an intensity of the blue light generated from a lower portion of the light generating module is greater than an intensity of each of the red and green lights generated from the lower portion of the light generating module, and an intensity of the red light generated from an upper portion of the light generating module is greater than an intensity of each of the green and blue lights generated from the upper portion of the light generating module.

The intensity of the green light is uniform on substantially an entire area of the light generating module. However, the intensity of the blue light is increased on the lower portion of the light generating module, and is decreased on the upper portion of the light generating module. In addition, the intensity of the red light is decreased on the lower portion of the light generating module, and is increased on the upper portion of the light generating module.

Therefore, a bluish image is displayed on the lower portion of the LCD panel, and a reddish image is displayed on the upper portion of the LCD panel.

However, when the adjusted driving voltages are applied to the light generating module, from the power supplying unit 410, the intensity uniformity of the red, green, and blue lights is increased.

Therefore, a uniform color image is displayed on the lower and upper portions of the LCD panel using the uniform red, green, and blue lights.

Figure 5:
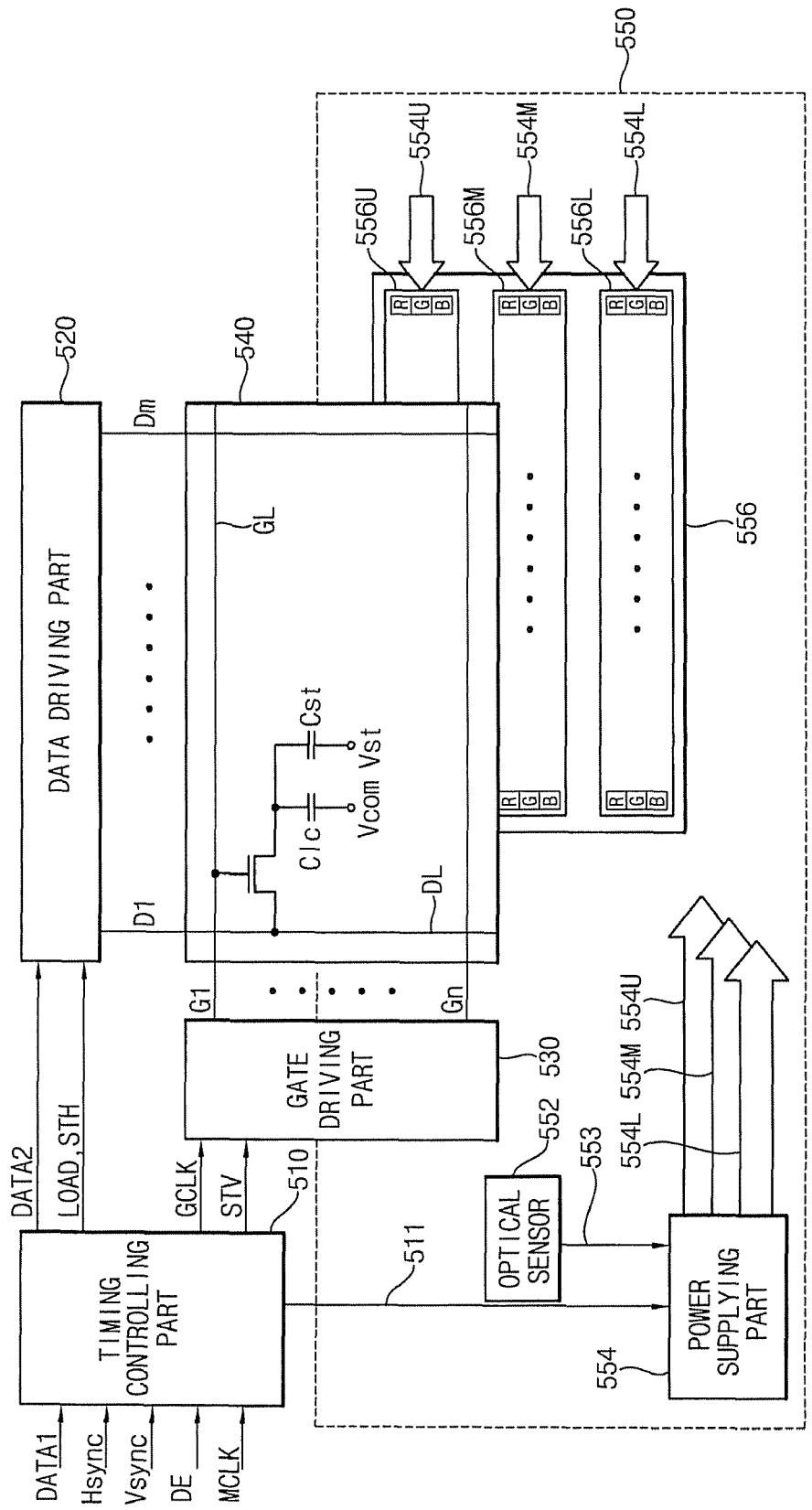
FIG. 5 is a block diagram illustrating an exemplary LCD device in accordance with another exemplary embodiment of the present invention.

FIG. 5 is a block diagram illustrating an exemplary LCD device in accordance with another exemplary embodiment of the present invention.

Referring to FIG. 5, the LCD device includes a timing controlling part 510, a data driving part 520, a gate driving part 530, an LCD panel 540, and a light emitting part 550. The light emitting part 550 is on a lower surface of the LCD panel 540 to supply the LCD panel 540 with light. The light emitting part 550 functions as a backlight assembly for the LCD panel 540.

The timing controlling part 510 receives a first data signal DATA1, synchronizing signals Hsync and Vsync, a data enable signal DE, and a main clock MCLK from an external device such as a graphic controller. The synchronizing signals Hsync and Vsync may include a horizontal synchronizing signal Hsync and a vertical synchronizing signal Vsync.

The timing controlling part 510 applies second data signal DATA2 and data driving signals LOAD and STH to the data driving part 520. The data driving signals LOAD and STH control an output of the second data signal DATA2. The data driving signals LOAD and STH include a load signal LOAD and a horizontal start signal STH. The load signal LOAD controls loading of the second data signal DATA2. The horizontal start signal STH controls starting of activation of horizontal lines.

The timing controlling part 510 applies gate driving signals GCLK and STV to the gate driving part 530. The gate driving signals GCLK and STV includes a gate clock GCLK and a vertical start signal STV. The vertical start signal STV controls the starting of a first frame.

The timing controlling part 510 applies a current control signal 511 to the light emitting part 550 based on the vertical start signal STV.

The data driving part 520 changes the second data signal DATA2 from the timing controlling part 510 into data voltages D1, D2, . . . Dm, wherein m is a natural number or a multiple number of three. The data voltages D1, D2, . . . Dm are pixel voltages. The data voltages D1, D2, . . . Dm are applied to data lines DL of the LCD panel 540, respectively.

The gate driving part 530 applies gate signals G1, G2, . . . Gn to gate lines GL of the LCD panel 540 based on the gate driving signal GCLK and STV, in sequence. The gate signals G1, G2, . . . Gn activate the gate lines of the LCD panel 540, wherein n is a natural number.

The LCD panel 540 includes an array substrate (not shown), an opposite substrate (not shown), and a liquid crystal layer (not shown). The opposite substrate faces the array substrate. The liquid crystal layer is interposed between the array substrate and the opposite substrate. For example, the array substrate includes the gate lines GL, the data lines DL, and a plurality of pixel parts (not shown). The gate lines GL transmit the gate signals G1, G2, . . . Gn. The gate signals may be scan signals. The data lines DL transmit the data voltages D1, D2, . . . Dm. The data lines DL may be source lines. The pixel parts are formed in regions defined by the gate and data lines GL and DL adjacent to each other. Each of the pixel parts includes a switching element and a pixel electrode (not shown) electrically connected to the switching element. The opposite substrate includes a transparent substrate, a common electrode (not shown), and a color filter layer (not shown). The common electrode is formed on the transparent substrate, and faces the pixel electrode. Alternate arrangements of the LCD panel 540 would also be within the scope of these embodiments.

The light emitting part 550 includes an optical sensor 552, a power supplying part 554, and a light emitting group 556. The light emitting part 550 emits red, green, and blue lights based on the current control signal 511 that is from the timing controlling part 510 to supply the LCD panel 540 with the red, green, and blue lights.

For example, the optical sensor 552 senses intensities of the red, green, and blue lights that are generated from the light emitting part 550 to apply the light sensing signal 553 to the power supplying part 554. The light sensing signal 553 includes a red sensing signal, a green sensing signal, and a blue sensing signal.

The power supplying part 554 applies an upper current 554U, a middle current 554M, and a lower current 554L to the light emitting group 556 based on the current control signal 511. The power supplying part 554 also applies a gate on voltage VON and a gate off voltage VOFF (not shown) to the gate driving part 530. Levels of the gate on voltage VON and the gate off voltage VOFF are determined to turn on and turn off the switching elements of the LCD panel 540. The switching elements may include amorphous silicon ("a-Si") TFTs.

The light emitting group 556 includes an upper light emitting portion 556U, a middle light emitting portion 556M, and a lower light emitting portion 556L. The light emitting group 556 is on a rear surface of the LCD panel 540 to form the backlight assembly. The upper light emitting portion 556U is on an upper portion above the middle light emitting portion 556M, and the lower light emitting portion 556L is on a lower portion below the middle light emitting portion 556M. In other words, the middle light emitting portion 556M is formed between the upper light emitting portion 556U and the lower light emitting portion 556L.

Each of the upper, middle, and lower light emitting portions 556U, 556M, and 556L includes red, green, and blue light emitting elements. Each of the light emitting elements may include an LED. The number of red, green, and blue light emitting elements contained within each of the upper, middle, and lower light emitting portions 556U, 556M, and 556L may vary. For example, the middle light emitting portion 556M may contain more red, green, and blue light emitting elements than the upper and lower light emitting portions 556U and 556L.

The upper light emitting portion 556U generates red, green, and blue lights based on the upper current 554U to supply the LCD panel 540 with the red, green, and blue lights.

The middle light emitting portion 556M generates red, green, and blue lights based on the middle current 554M to supply the LCD panel 540 with the red, green, and blue lights. The lower light emitting portion 556L generates red, green, and blue lights based on the lower current 554L to supply the LCD panel 540 with the red, green, and blue lights.

Figure 6:
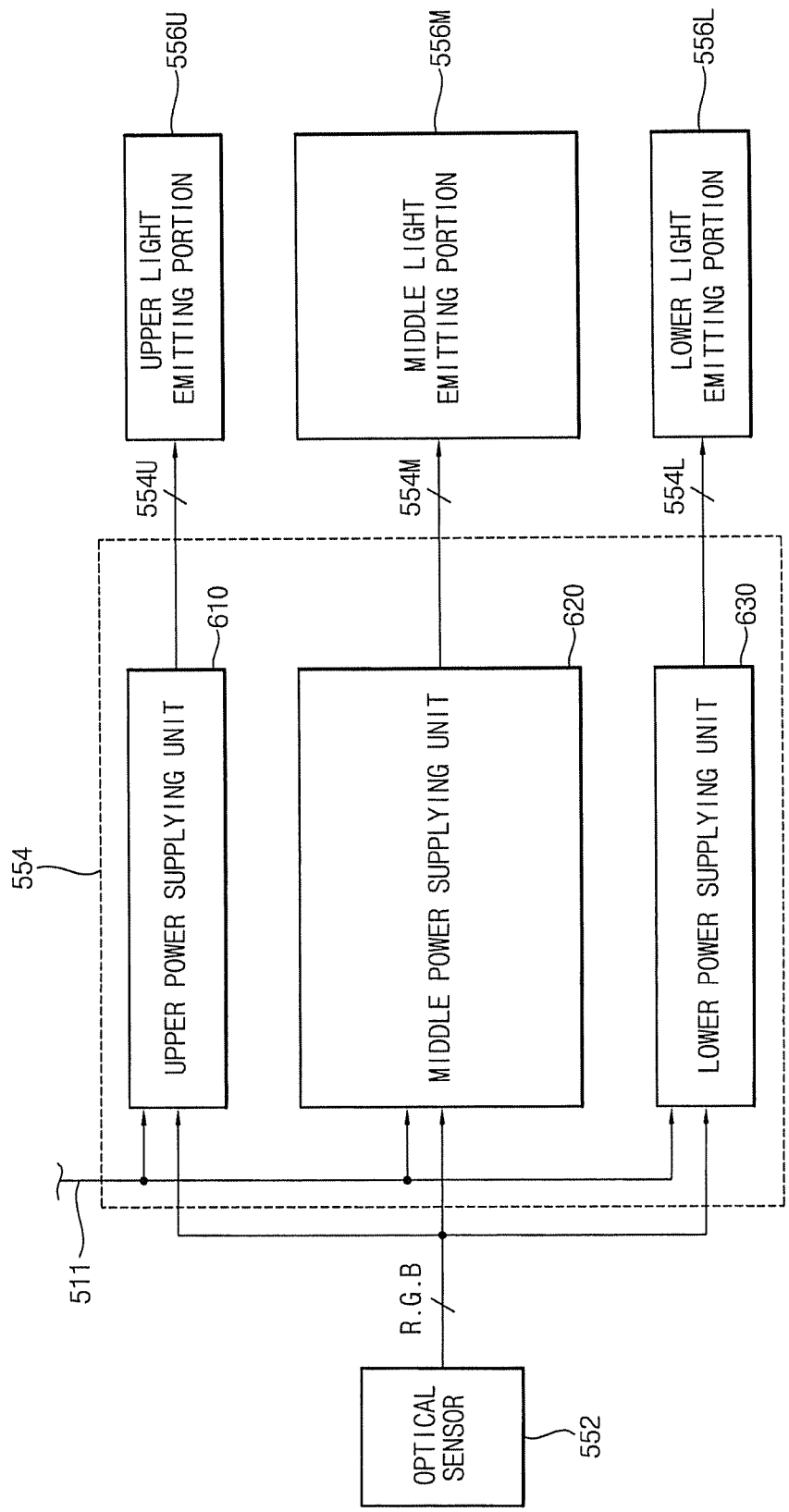
FIG. 6 is a block diagram illustrating an exemplary power supplying part shown in FIG. 5.

FIG. 6 is a block diagram illustrating an exemplary power supplying part shown in FIG. 5.

Referring to FIGS. 5 and 6, the power supplying part 554 includes an upper power supplying unit 610, a middle power supplying unit 620, and a lower power supplying unit 630. The power supplying part 554 applies driving currents to the upper power supplying unit 610, the middle power supplying unit 620, and the lower power supplying unit 630 based on the red, green, and blue sensing signals that are from the optical sensor 552. The upper current 554U is supplied from the upper power supplying unit 610. The middle current 554M is supplied from the middle power supplying unit 620. The lower current 554L is supplied from the lower power supplying unit 630.

The upper power supplying unit 610, the middle power supplying unit 620 and the lower power supplying unit 630 apply the driving currents 554U, 554M, 554L to the upper light emitting portion 556U, the middle light emitting portion 556M, and the lower light emitting portion 556L, respectively. The upper light emitting portion 556U includes an uppermost red LED, and the lower light emitting portion 556L includes a lowermost blue LED.

The upper power supplying part 610 applies the driving voltage of a normal level to a green LED on a central portion of the upper light emitting portion 556U. In addition, the upper power supplying part 610 applies the driving voltage of a lower level to a red LED on an upper portion of the upper light emitting portion 556U. The upper power supplying part 610 applies the driving voltage of a higher level to a blue LED on a lower portion of the upper light emitting portion 556U.

The lower power supplying part 630 applies the driving voltage of the normal level to a green LED on a central portion of the lower light emitting portion 556L. In addition, the lower supplying part 630 applies the driving voltage of the higher level to a red LED on an upper portion of the lower light emitting portion 556L. The lower power supplying part 630 applies the driving voltage of the lower level to a blue LED on a lower portion of the lower light emitting portion 556L.

The middle power supplying part 620 applies the driving voltage of the normal level to the red, green, and blue LEDs of the middle light emitting portion 556M.

Thus, the intensity of the red light is increased in the lower light emitting portion 556L on the lower portion of the light emitting group 556, and is decreased in the upper light emitting portion 556U on the upper portion of the light emitting group 556.

In addition, the intensity of the blue light is decreased in the lower light emitting portion 556L on the lower portion of the light emitting group 556, and is increased in the upper light emitting portion 556U on the upper portion of the light emitting group 556.

Figure 7:
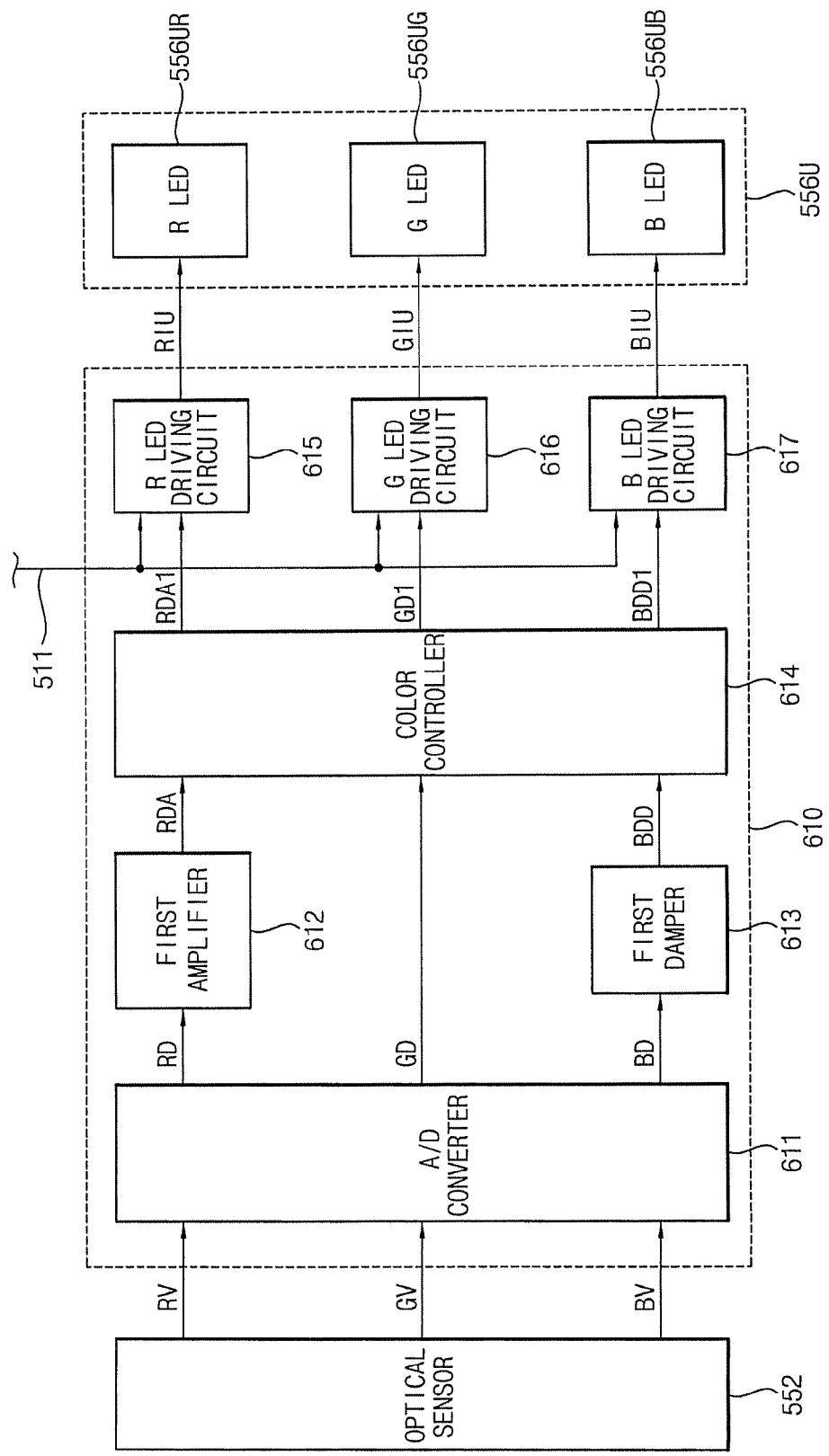
FIG. 7 is a block diagram illustrating an exemplary upper power supplying unit shown in FIG. 6.

FIG. 7 is a block diagram illustrating an exemplary upper power supplying unit shown in FIG. 6.

Referring to FIG. 7, the upper power supplying unit 610 includes an analog/digital ("A/D") converter 611, a first amplifier 612, a first damper 613, a color controller 614, a red LED driving circuit 615, a green LED driving circuit 616, and a blue LED driving circuit 617. The red LED driving circuit 615, the green LED driving circuit 616, and the blue LED driving circuit 617 are electrically connected to an upper red LED 556UR, an upper green LED 556UG, and an upper blue LED 556UB, respectively.

The A/D converter 611 changes a red light sensing signal RV, a green light sensing signal GV, and a blue light sensing signal BV that are from the optical sensor 552 into red light sensing data RD, green light sensing data GD, and blue light sensing data BD, respectively. The red, green, and blue light sensing data RD, GD, and BD are digital data. The A/D converter 611 applies the red and blue light sensing data RD and BD to the first amplifier 612 and the first damper 613, respectively, and applies the green light sensing data GD to the color controller 614.

The first amplifier 612 amplifies the red light sensing data RD, and applies the amplified red light sensing data RDA to the color controller 614.

The first damper 613 damps the blue light sensing data BD, and applies the damped blue light sensing data BDD to the color controller 614.

Based on the amplified upper red light sensing data RDA, the green light sensing data GD, and the damped blue light sensing data BDD, the color controller 614 applies an upper red light control signal RDA1, an upper green light control signal GD1, and an upper blue light control signal BDD1 to the red LED driving circuit 615, the green LED driving circuit 616, and the blue LED driving circuit 617, respectively.

The red LED driving circuit 615 applies an upper red light driving current RIU to the upper red LED 556UR based on the current control signal 511 and the upper red light control signal RDA1. The red LED driving circuit 615 may include a pulse width modulation integrated circuit ("PWM IC"). The PWM IC of the red LED driving circuit 615 applies the upper red light driving current RIU that is decreased to the upper red LED 556UR based on the upper red light control signal RDA1 using an amplified output duty.

The green LED driving circuit 616 applies an upper green light driving current GIU to the upper green LED 556UG based on the current control signal 511 and the upper green light control signal GD1. The green LED driving circuit 616 may include a PWM IC. The PWM IC of the green LED driving circuit 616 applies the upper green light driving current GIU to the upper green LED 556UG based on the upper green light control signal GD1 using a constant output duty.

The blue LED driving circuit 617 applies an upper blue light driving current BIU to the upper blue LED 556UB based on the current control signal 511 and the upper blue light control signal BDD1. The blue LED driving circuit 617 may include a PWM IC. The PWM IC of the blue LED driving circuit 617 applies the upper blue light driving current BIU that is increased to the upper blue LED 556UB based on the upper blue light control signal BDD1 using a damped output duty.

In FIG. 7, the upper power supplying unit 610 includes the first amplifier 612 and the first damper 613. Alternatively, one of the first amplifier 612 and the first damper 613 may be omitted.

Figure 8:
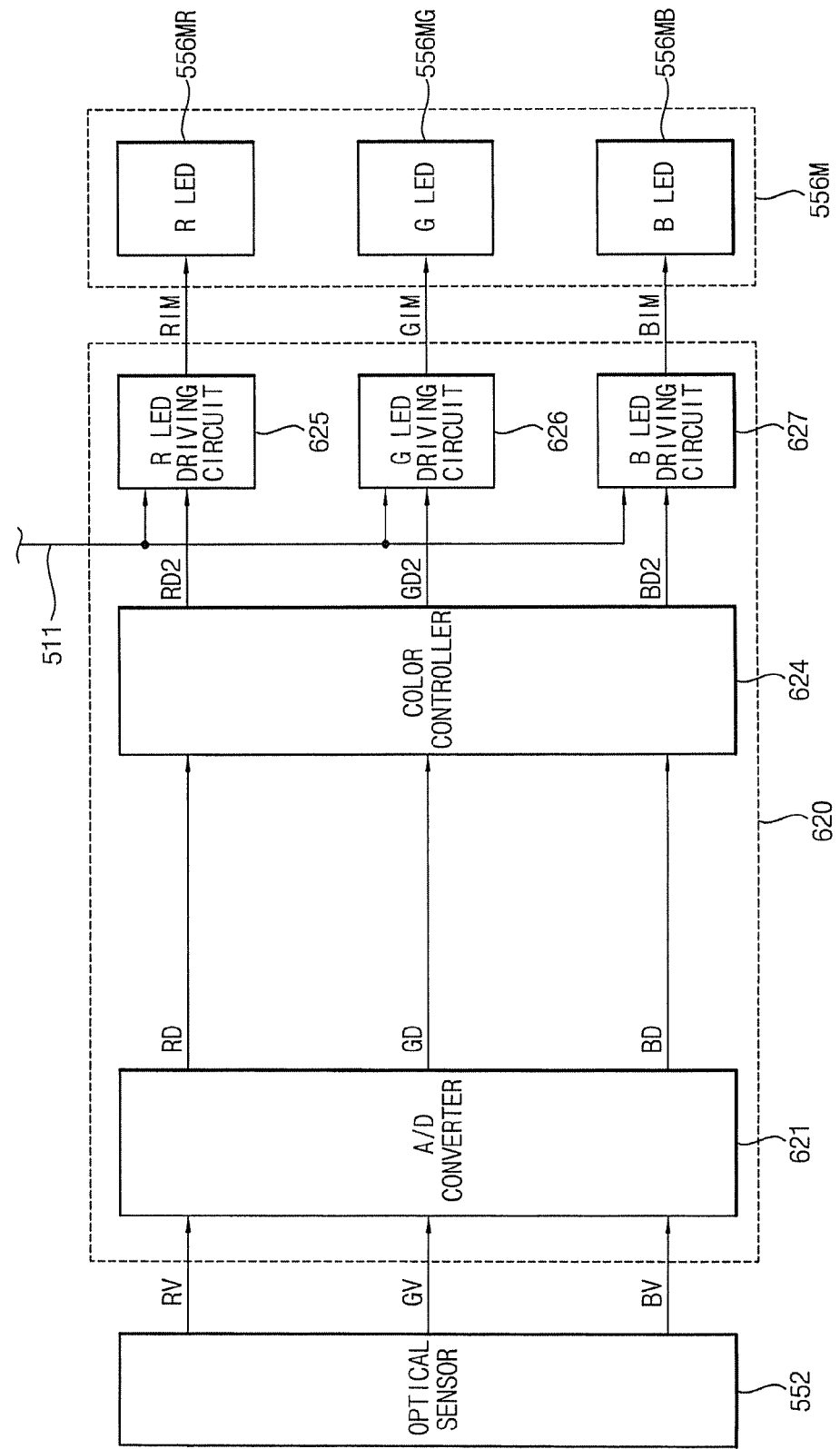
FIG. 8 is a block diagram illustrating an exemplary middle power supplying unit shown in FIG. 6.

FIG. 8 is a block diagram illustrating an exemplary middle power supplying unit shown in FIG. 6.

Referring to FIG. 8, the middle power supplying unit 620 includes an A/D converter 621, a color controller 624, a red LED driving circuit 625, a green LED driving circuit 626, and a blue LED driving circuit 627. The red LED driving circuit 625, the green LED driving circuit 626, and the blue LED driving circuit 627 of the middle power supplying unit 620 are electrically connected to a middle red LED 556MR, a middle green LED 556MG, and a middle blue LED 556MB, respectively.

The A/D converter 621 of the middle power supplying unit 620 changes a red light sensing signal RV, a green light sensing signal GV and a blue light sensing signal BV that are from the optical sensor 552 into red light sensing data RD, green light sensing data GD, and blue light sensing data BD, respectively. The red, green, and blue light sensing data RD, GD and BD are digital data. The A/D converter 621 of the middle power supplying unit 620 applies the red, green, and blue light sensing data RD, GD, and BD to the color controller 624 of the middle power supplying unit 620.

The color controller 624 of the middle power supplying unit 620 applies a red light control signal RD2, a green light control signal GD2, and a blue light control signal BD2 to the red LED driving circuit 625, the green LED driving circuit 626, and the blue LED driving circuit 627 of the middle power supplying unit 620 based on the red light sensing data RD, the green light sensing data GD, and the blue light sensing data BD, respectively.

The red LED driving circuit 625 of the middle power supplying unit 620 applies a middle red light driving current RIM to the middle red LED 556MR based on the current control signal 511 and the red light control signal RD2.

The green LED driving circuit 626 of the middle power supplying unit 620 applies a middle green light driving current GIM to the middle green LED 556MG based on the current control signal 511 and the green light control signal GD2.

The blue LED driving circuit 627 of the middle power supplying unit 620 applies a middle blue light driving current BIM to the middle blue LED 556MB based on the current control signal 511 and the blue light control signal BD2.

Figure 9:
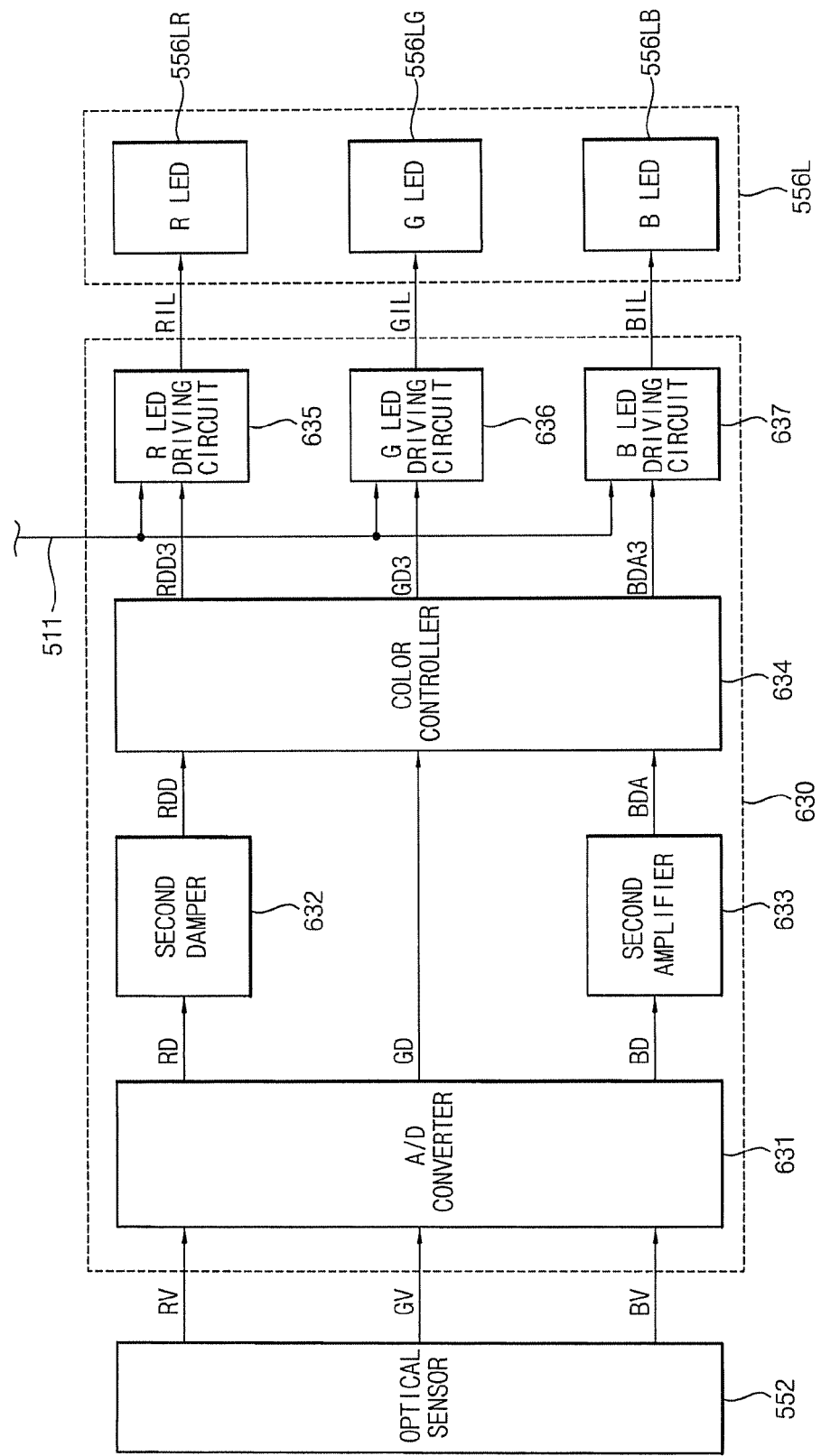
FIG. 9 is a block diagram illustrating an exemplary lower power supplying unit shown in FIG. 6.

FIG. 9 is a block diagram illustrating an exemplary lower power supplying unit shown in FIG. 6.

Referring to FIG. 9, the lower power supplying unit 630 includes an A/D converter 631, a second amplifier 633, a second damper 632, a color controller 634, a red LED driving circuit 635, a green LED driving circuit 636, and a blue LED driving circuit 637. The red LED driving circuit 635, the green LED driving circuit 636, and the blue LED driving circuit 637 of the lower power supplying unit 630 are electrically connected to a lower red LED 556LR, a lower green LED 556LG, and a lower blue LED 556LB, respectively.

The A/D converter 631 of the lower power supplying unit 630 changes a red light sensing signal RV, a green light sensing signal GV, and a blue light sensing signal BV that are from the optical sensor 552 into red light sensing data RD, green light sensing data GD, and blue light sensing data BD, respectively. The red, green, and blue light sensing data RD, GD, and BD are digital data. The A/D converter 631 of the lower power supplying unit 630 applies the red and blue light sensing data RD and BD to the second damper 632 and the second amplifier 633 of the lower power supplying unit 630, and applies the green light sensing data GD to the color controller 634 of the lower power supplying unit 630.

The second damper 632 of the lower power supplying unit 630 damps the red light sensing data RD, and applies the damped red light sensing data RDD to the color controller 634 of the lower power supplying unit 630.

The second amplifier 633 of the lower power supplying unit 630 amplifies the blue light sensing data BD, and applies the amplified blue light sensing data BDA to the color controller 634 of the lower power supplying unit 630.

The color controller 634 of the lower power supplying unit 630 applies a lower red light control signal RDD3, a lower green light control signal GD3, and a lower blue light control signal BDA3 to the red LED driving circuit 635, the green LED driving circuit 636, and the blue LED driving circuit 637 based on the damped upper red light sensing data RDD, the green light sensing data GD, and the amplified blue light sensing data BDA, respectively.

The red LED driving circuit 635 of the lower power supplying unit 630 applies a lower red light driving current RIL to the lower red LED 556LR based on the current control signal 511 and the lower red light control signal RDD3. The red LED driving circuit 635 of the lower power supplying unit 630 may include a PWM IC. The PWM IC of the red LED driving circuit 635 applies the lower red light driving current RIL that is increased to the lower red LED 556LR based on the lower red light control signal RDD3 using a damped output duty.

The green LED driving circuit 636 of the lower power supplying unit 630 applies a lower green light driving current GIL to the lower green LED 556LG based on the current control signal 511 and the lower green light control signal GD3. The green LED driving circuit 636 of the lower power supplying unit 630 may include a PWM IC. The PWM IC of the green LED driving circuit 636 of the lower power supplying unit 630 applies the lower green light driving current GIL to the lower green LED 556LG based on the lower green light control signal GD3 using a constant output duty.

The blue LED driving circuit 637 of the lower power supplying unit 630 applies a lower blue light driving current BIL to the lower blue LED 556LB based on the current control signal 511 and the lower blue light control signal BDA3. The blue LED driving circuit 637 of the lower power supplying unit 630 may include a PWM IC. The PWM IC of the blue LED driving circuit 637 applies the lower blue light driving current BIL that is decreased to the lower blue LED 556LB based on the lower blue light control signal BDA3 using an amplified output duty.

In FIG. 9, the upper power supplying unit 630 includes the second amplifier 632 and the second damper 633. Alternatively, one of the second amplifier 632 and the second damper 633 may be omitted.

A method of improving color reproducibility in a display panel of the above described exemplary embodiments of a display device may include providing a light emitting part having a first region, a second region, and a third region, the second region disposed between the first and third regions, the first region providing light to a first outermost section of the display panel, the third region providing light to a second outermost section of the display panel, opposite the first outermost section, the second region providing light to a middle section of the display panel between the first and second outermost sections, decreasing an intensity of a red light provided to the first outermost section from the first region, increasing an intensity of a blue light provided to the first outermost section from the first region, maintaining intensity of a red light and a blue light provided to the middle section from the second region, increasing an intensity of a red light provided to the second outermost section from the third region, and decreasing an intensity of a blue light provided to the second outermost section from the third region.

The method may further include providing a current control signal and light sensing signals to a power supplying part and delivering light driving currents to the first, second, and third regions of the light emitting part from the power supplying part based on the current control signal and the light sensing signals, wherein decreasing an intensity of the red light provided to the first outermost section from the first region is based on a first red light driving current from the power supplying part, increasing an intensity of the blue light provided to the first outermost section from the first region is based on a first blue light driving current from the power supplying part, maintaining intensity of the red light and the blue light provided to the middle section from the second region is based on a second red light driving current and a second blue light driving current from the power supplying part, increasing an intensity of the red light provided to the second outermost section from the third region is based on a third red light driving current from the power supplying part, and decreasing an intensity of the blue light provided to the second outermost section from the third region is based on a third blue light driving current from the power supplying part.

Another method of improving color reproducibility in a display panel of a display device may be provided as follows. First and second lights are generated in each of a first region and a second region of a light emitting part. The first and second lights have different wavelengths from each other. The first region provides light to an outermost section of the display panel, and the second region provides light to a central section of the display panel. Intensities of the first and second lights provided to the outermost section of the display panel are sensed. The intensity of at least one of the first and second lights provided to the outermost section of the display panel is adjusted so that the outermost section and the middle section have substantially the same color reproducibility.

The intensity of the at least one of the first and second lights may be adjusted by increasing the intensity of the first light provided to the outermost section of the display panel. In addition, the intensity of the at least one of the first and second lights may be adjusted by decreasing the intensity of the second light provided to the outermost section of the display panel. The first and second lights may be red and blue lights, respectively. Alternatively, the first and second light may be blue and red lights, respectively.

Alternate methods of increasing the color uniformity of a backlight unit and improving the color reproducibility of a display panel of a display device, using the above-described exemplary embodiments of light generating modules and display devices, would also be within the scope of these embodiments.

According to the present invention, the color uniformity of the backlight unit is increased, although the backlight unit includes LEDs of three colors. Thus, the color difference on the uppermost portion and the lowermost portion of the LCD panel is removed. For example, the bluish image on the LCD panel corresponding to the lower portion of the backlight unit, and the reddish image on the LCD panel corresponding to the upper portion of the backlight unit are removed.

Therefore, the color uniformity on the LCD panel on the lower and upper portion of the light generating module is increased so that color reproducibility of the color image is improved.

This invention has been described with reference to exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A light generating module comprising:
   a light emitting part including:
      a first region and a second region;
      a plurality of optical clusters having lights emitting element generating a first light in each of the first and second regions, the first region being an outermost region of the light emitting part; and
   a power supplying part applying different currents to the first light emitting element in said each of the first region and the second region to generate the first light having different intensities from each other.

2. The light generating module of claim 1, wherein each of the optical clusters further includes a second light emitting element generating a second light in each of the first and second regions, and the first and second lights have different colors from each other.

3. The light generating module of claim 2, further comprising an optical sensor applying a first light sensing signal and a second light sensing signal to the power supplying part, the first light sensing signal corresponding to luminance of the first light, the second light sensing signal corresponding to luminance of the second light.

4. The light generating module of claim 3, wherein the power supplying part comprises a first power supplying unit applying driving currents to a plurality of light emitting elements in the first region, and the first power supplying unit includes:
   an analog/digital converter changing the first and second light sensing signals into first light sensing data and second light sensing data, respectively;
   a first amplifier amplifying the first light sensing data to form amplified first light sensing data;
   a color controller generating a first light control signal and a second light control signal based on the amplified first light sensing data and the second light sensing data;
   a first driving circuit generating a first light driving current based on the first light control signal to generate the first light; and
   a second driving circuit generating a second light driving current based on the second light control signal to generate the second light.

5. The light generating module of claim 4, wherein
   the first light emitting element is formed in the first region adjacent to a side of the light emitting part, and
   the second light emitting element is formed in the first region spaced apart from the side of the light emitting part.

6. The light generating module of claim 4, wherein the power supplying part further comprises a second power supplying unit applying driving currents to a plurality of light emitting elements in the second region, and the second power supplying unit includes:
   an analog/digital converter changing the first and second light sensing signals into first light sensing data and second light sensing data, respectively;
   a color controller generating a first light control signal and a second light control signal based on the first and second light sensing data from the analog/digital converter in the second power supplying unit;
   a first driving circuit generating a first light driving current based on the first light control signal from the color controller in the second power supplying unit to generate the first light; and
   a second driving circuit generating a second light driving current based on the second light control signal from the color controller in the second power supplying unit to generate the second light.

7. The light generating module of claim 6, wherein the light emitting part further comprises a third light emitting element generating a third lightregion emitting the first and second lights, and the third region is opposite to the first region.

8. The light generating module of claim 7, wherein the power supplying part further comprises a third power supplying unit that supplies driving currents to a plurality of light emitting elements in the third region, the third power supplying unit includes:

an analog/digital converter changing the first and second light sensing signals into first light sensing data and second light sensing data, respectively;

a second damper that damps the first light sensing data from the analog/digital converter in the third power supplying unit to form damped first light sensing data;

a color controller generating a first light control signal and a second light control signal based on the damped first light sensing data and the second light sensing data from the analog/digital converter in the third power supplying unit;

a first driving circuit generating a first light driving current based on the first light control signal from the color controller in the third power supplying unit to generate the first light; and a second driving circuit generating a second light driving current based on the second light control signal from the color controller in the third power supplying unit to generate the second light.

9. The light generating module of claim 1, wherein each of the first region and the second region emit a third light having a different color from the first and second lights.

10. The light generating module of claim 9, further comprising an optical sensor applying a first light sensing signal corresponding to luminance of the first light to the power supplying part, a second light sensing signal corresponding to luminance of the second light to the power supplying part, and a third light sensing signal corresponding to luminance of the third light to the power supplying part.

11. The light generating module of claim 10, wherein the light emitting part further comprises a third region emitting first, second, and third lights having different colors from each other and facing the first region, and the second region corresponds to a central region of the light emitting part between the first and third regions, and the power supplying part includes a first power supplying unit that applies driving currents to a plurality of light emitting elements in the first region, respectively, and the first power supplying unit includes:

an analog/digital converter changing the first, second, and third light sensing signals into first light sensing data, second light sensing data, and third light sensing data, respectively;

a first amplifier amplifying the first light sensing data to form amplified first light sensing data;

a first damper damping the third light sensing data to form damped third light sensing data;

a color controller generating a first light control signal, a second light control signal, and a third light control signal based on the amplified first light sensing data, the second light sensing data, and the damped third light sensing data;

a first driving circuit generating a first light driving current based on the first light control signal to generate the first light;

a second driving circuit generating a second light driving current based on the second light control signal to generate the second light; and a third driving circuit generating a third light driving current based on the third light control signal to generate the third light.

12. The light generating module of claim 11, wherein the light generating part further comprises:

a first light emitting element adjacent to a side of the first region or the third region to generate the first light;

a second light emitting element on a central portion of the first region or the third region to generate the second light; and a third light emitting element adjacent to an opposite side of the first region or the third region to generate the third light.

13. The light generating module of claim 11, wherein the power supplying part further comprises a second power supplying unit that applies driving currents to a plurality of light emitting elements in the second region, respectively, and the second power supplying unit includes:

an analog/digital converter changing the first, second, and third light sensing signals into first light sensing data, second light sensing data, and third light sensing data, respectively;

a color controller generating a first light control signal, a second light control signal, and a third light control signal based on the first, second, and third light sensing data from the analog/digital converter in the second power supplying unit;

a first driving circuit generating a first light driving current based on the first light control signal from the color controller in the second power supplying unit to generate the first light;

a second driving circuit generating a second light driving current based on the second light control signal from the color controller in the second power supplying unit to generate the second light; and a third driving circuit generating a third light driving current based on the third light control signal from the color controller in the second power supplying unit to generate the third light.

14. The light generating module of claim 13, wherein the power supplying part further comprises a third power supplying unit that applies driving currents to a plurality of light emitting elements in the third region, respectively, and the third power supplying unit includes:

an analog/digital converter changing the first, second and third light sensing signals into first light sensing data, second light sensing data, and third light sensing data, respectively;

a second damper that damps the first light sensing data from the analog/digital converter in the third power supplying unit, to form damped first light sensing data;

a second amplifier that amplifies the third light sensing data from the analog/digital converter in the third power supplying unit, to form amplified third light sensing data;

a color controller generating a first light control signal, a second light control signal, and a third light control signal based on the damped first light sensing data, the second light sensing data from the analog/digital converter in the third power supplying unit, and the amplified third light sensing data;

a first driving circuit generating a first light driving current based on the first light control signal from the color controller in the third power supplying unit to generate the first light;

a second driving circuit generating a second light driving current based on the second light control signal from the color controller in the third power supplying unit to generate the second light; and a third driving circuit generating a third light driving current based on the third light control signal from the color controller in the third power supplying unit to generate the third light.

15. The light generating module of claim 9, wherein the light emitting part further comprises a first light emitting element generating the first light, a second light emitting element generating the second light, and a third light emitting element generating the third light, and the first, second, and third light emitting elements are arranged in serial.

16. The light generating module of claim 15, wherein the power supplying part applies a lower current and a higher current that is greater than the lower current to a light emitting element adjacent to a side of the light emitting part in the first region and a light emitting element spaced apart from the side of the light emitting part in the first region, respectively.

17. A method of improving color reproducibility in a display panel of a display device, the method comprising:
generating first and second lights in each of a first region and a second region of a light emitting part, the first and second lights having different wavelengths from each other, the first region providing light to an outermost section of the display panel, the second region providing light to a central section of the display panel; and
adjusting intensity of at least one of the first and second lights provided to the outermost section of the display panel so that the outermost section and the middle section have substantially the same color reproducibility.

18. The method of claim 17, wherein adjusting intensity of at least one of the first and second lights comprises, increasing the intensity of the first light provided to the outermost section of the display panel.

19. The method of claim 17, wherein adjusting intensity of at least one of the first and second lights comprises, decreasing the intensity of the second light provided to the outermost section of the display panel.

20. The method of claim 17, further comprising sensing intensities of the first and second lights provided to the outermost section of the display panel.

21. The method of claim 17, wherein adjusting intensity of at least one of the first and second lights comprises, increasing the intensity of the first light provided to the outermost section of the display panel.

22. The method of claim 21, wherein adjusting intensity of at least one of the first and second lights comprises, decreasing the intensity of the second light provided to the outermost section of the display panel.

23. The method of claim 21, further comprising sensing intensities of the first and second lights provided to the outermost section of the display panel.

\* \* \* \* \*